United States Patent

Robey

Patent Number: 5,417,057
Date of Patent: May 23, 1995

[54] THERMODYNAMIC DRIVE

[76] Inventor: Marvin L. Robey, 13133 Joshua Ave., Chino, Calif. 91710

[21] Appl. No.: 115,899

[22] Filed: Sep. 1, 1993

Related U.S. Application Data

[63] Continuation-in-part of Ser. No. 965,743, Oct. 23, 1992, abandoned.

[51] Int. Cl.$^6$ .................. F02K 1/36; F02K 7/00
[52] U.S. Cl. ..................... 60/269; 60/39.52; 60/39.58
[58] Field of Search ........... 60/39.05, 39.141, 39.52, 60/39.58, 39.59, 242, 267, 269, 736

[56] References Cited

U.S. PATENT DOCUMENTS

| | | | |
|---|---|---|---|
| 2,663,142 | 12/1953 | Wilson | 60/269 |
| 2,670,597 | 3/1954 | Villemejane | 60/269 |
| 3,323,304 | 6/1967 | Llobet et al. | 60/269 |
| 3,425,225 | 2/1969 | Krause | 60/39.59 |
| 3,899,923 | 8/1975 | Teller | 60/39.5 |
| 4,448,577 | 5/1984 | Paczkowski | 60/39.59 |

*Primary Examiner*—Louis J. Casaregola
*Attorney, Agent, or Firm*—Albert O. Cota

[57] ABSTRACT

An improved thermodynamic drive which accelerates exhaust gases through a convergent-divergent exhaust nozzle (14) from a high pressure combustion chamber 12 to an ultra high velocity and by entraining atmospheric air therein; transfers a portion of the inertia from those exhaust gases to the atmospheric air flowing through an atmospheric air nozzle 16. Cool water is injected by water injectors (25) into the flow of air which is isothermally compressed by rapidly decelerating into a high pressure water separator (28). The water separator separates water condensed from the air by the compression and water cooling, and also the water injected into the air. Some of this water is cooled in a heat exchanger (30) and re-injected into the air flowing through the atmospheric air nozzle for cooling the compression. The remainder of the water is mixed with the fuel by mixer (35). The fuel/water mixture is pumped by fuel pump (42) at a high pressure into a fuel vaporizer chamber as a mist and vaporizes before passing into a fuel/water superheater (48). The fuel/water vapor is injected by fuel injector (52) through combustion chamber inlet (13) into the combustion chamber (12) to complete the cycle. The water in the fuel and the vaporizer chamber prevent carbon deposits in the system. The fuel vapor injection further compresses the intake air into the combustion chamber. A standing wave may be used to further compress the air.

7 Claims, 5 Drawing Sheets

THERMODYNAMIC DRIVE

CROSS REFERENCE TO RELATED APPLICATION

This application is a Continuation-in-part of U.S. application Ser. No. 07/965,743 filed 23 Oct. 1992, now abandoned.

TECHNICAL FIELD

The invention pertains generally to thermodynamic drives, and more particularly to an improved supercharged thermodynamic drive having no essential moving parts. The drive employs a high inertial energy of exhaust gases that is transferred to atmospheric air to compress the air into a combustion chamber at high pressure. The energy, produced by high pressure and high temperature fuel vapor, functions as an additional stage of compression of the intake air into the combustion chamber to produce efficient energy of combustion without the use of a mechanical compressor, for the purpose of producing usable power. The air intake system may be sealed off so as to inject oxygen into the combustion chamber instead of air and an exhaust nozzle extended, thus allowing use in an anoxic environment.

BACKGROUND ART

Present thermodynamic drives are usually in the form of internal combustion engines or gas turbines which require a high level of technology in their construction. These drives use pistons, crankshafts and other expensive parts that are subject to wear and failure, or high speed turbines or blowers to compress the air into the combustion chamber. These compressor turbines and blowers require additional power turbines to drive them, in addition to the power turbines to drive any usable equipment.

Turbines are expensive, relatively heavy and bulky in comparison to the other drive components, and very sensitive to the ingestion of debris, sand and especially birds. Ultra-high operating speeds and temperatures are also necessary for good efficiency. When debris is ingested, turbine blades can be damaged and/or suddenly thrown from the drive, endangering human life and nearby equipment. Turbines are incapable of operating at low atmospheric pressure and are entirely unsuited to dual with and without supplemental oxygen.

Vapor pressure engines that use the pressure of boiling fuel to compress the intake air into a combustion chamber have been experimented with for many years. However, all such engines have low operating efficiencies due to low combustion chamber pressures and resulting low ratio of heat drop during expansion, whereas high pressures and a high ratio of heat drop is essential to high efficiency. Furthermore, all such engines are very limited in the fuel they are capable of using, or they consume large amounts of distilled water to prevent carbon deposits from rapidly forming in the boiler, adding greatly to the load required to be carried by aircraft. Conventional ram jets are only effective at ultra-high air speeds and therefore cannot be used for take-off or for stationary use and again the combustion chamber pressure is usually relatively low, which results in low efficiency.

In view of the prior art engines, there is presently a need to provide:

a light, low cost, efficient engine to power aircraft, boats, rail trains, and other vehicles;

a very light jet engine to produce controllable air flow over aircraft control surfaces, and to produce wing lift at very low flying speeds and while the aircraft is hovering. Such an engine could also be made to pivot so as to allow the aircraft to be controlled at low speed;

a fuel-efficient, lower-cost gas pressure generator to drive turbines, particularly if air can be compressed for combustion without requiring power from the main turbine to be used for driving a compressor; and a powerful, low-cost blower that has application in several areas of industry as well as compressors and vacuum pumps.

There is presently a need for an engine to power aircraft, boats, and other vehicles and particularly space planes (now under development), which will operate from a standing start, take-off, through ultra-high air speeds in the atmosphere using atmospheric oxygen, and then convert to liquid-oxygen injection when atmospheric oxygen is insufficient. The weight of the total oxygen supply is almost prohibitive to carry, due to the fact that it requires several times as much weight of oxygen as fuel. Although rocket engines have proven themselves capable of reaching orbit and beyond while carrying the entire supply of liquid oxygen, it has been realized that the weight could be drastically reduced and fuel consumption and performance greatly improved if suitable power plants were available to operate both in and out of the atmosphere. Furthermore, the cost of liquid oxygen is quite high and is difficult to store, since it must be kept under high pressure, whereas the oxygen of the atmosphere is free and no storage tanks are necessary. Liquid oxygen can explode, and large quantities are dangerous to store and transport.

There is also a need for a more efficient, lighter, simpler and more compact jet engine for boats and ships. At the present time, ships use large quantities of polluting lubricants, which collect in the bilges and must be periodically pumped out. A smaller, more efficient drive would create more room for cargo, while reducing the number of a ship's crew. A drive with no moving parts would be safer, last longer, require drastically less maintenance, and prevent sea water from entering the hull via propeller shafts.

A need exists for a light, powerful, low cost blower in several areas of industry, as well as compressors and vacuum pumps.

A search of the prior art did not disclose any patents that read directly on the claims of the instant invention. However, the following patents were considered related:

| PATENT NO. | Nation | INVENTOR | ISSUE DATE |
|---|---|---|---|
| 304,644,746 | U.S. | Hartman | 24 Feb 1987 |
| 3,782,111 | U.S. | Kotoc | 1 Jan 1974 |
| 3,768,257 | U.S. | Neuffer | 30 Oct 1973 |
| 3,750,400 | U.S. | Sharpe | 7 Aug 1973 |
| 3,747,339 | U.S. | Wolf et al. | 24 Jul 1973 |
| 353,690,100 | U.S. | Wolf et al. | 12 Sep 1972 |
| P 20 09 808.2 | W. Germany | Reger | 23 Sep 1971 |
| 3,525,223 | U.S. | Radebold | 25 Aug 1970 |
| 3,382,679 | U.S. | Spoerlein | 14 May 1968 |
| 3,323,304 | U.S. | Llobet Et Al | 6 Jun 1967 |
| 2,807,209 | U.S. | Kennard | 24 Sep 1957 |
| 52,670,597 | U.S. | Villemejane | 2 Mar 1954 |

| PATENT NO. | Nation | INVENTOR | ISSUE DATE |
|---|---|---|---|
| 2,663,142 | U.S. | Wilson | 22 Dec 1953 |

Several of these patents teach the use of high temperature, high pressure fuel vapor to accelerate the combustible gases into the combustion chamber as one stage of compression, as does the present invention. Some of them also teach the use of exhaust gases to accelerate the intake air as does the present invention. But, unlike the present invention, this is done only by adiabatic compression, whereas the present invention provides for isothermal compression which greatly improves the compression.

No device was found which incorporates any of the following processes, as does the present invention:

1. The transfer of inertial energy from the exhaust gases to atmospheric air in such a way as to keep the exhaust gases and the atmospheric air virtually separate, then separate a portion of this high inertial air into an air intake system.
2. Isothermal compression of the intake air, cooling it with water as it compresses.
3. The separation of water from the compressed intake air to inject into the fuel boiler to prevent carbon deposits in the boiler and eliminate the use of a distilled water supply, as well as replenishing the injected cooling water.
4. The injection of the fuel into a chamber of preheated fuel vapor where the fuel is vaporized by the heat of the preheated fuel vapor to prevent the liquid fuel from boiling off of hot metal, further protecting the boiler from carbon deposits.
5. The use of a standing wave at an intake air inlet to increase compression.
6. The sealing of an air intake tube from backflow in such a way as to be able to inject oxygen into the combustion chamber and convert to an ultra-high combustion chamber pressure, combined with a convergent-divergent exhaust nozzle and a retractable exhaust nozzle extension, for the purpose of using the same engine efficiently in the atmosphere and also in an anoxic environment.

DISCLOSURE OF THE INVENTION

The principle object of the present invention is to provide a device that efficiently generates a high velocity and/or high pressure flow of gas as the means of transmitting power in a thermodynamic drive without the use of a mechanical compressor or other moving parts.

It is also an object of the invention to provide such a device that is safe, clean-burning with common fuels, simple, light and of low cost.

The preferred embodiment of the invention includes a combustion chamber and a compressor assembly. The combustion chamber has one or more convergent-divergent exhaust nozzle(s) similar to a liquid fueled rocket engine, which efficiently converts the high pressure energy in the combustion chamber into a high inertial energy of high level in the form of an ultra high-velocity flow of exhaust gases; a compressor assembly consisting of:

1. An atmospheric air nozzle: through the center of which the high velocity exhaust gases from an exhaust nozzle pass from the large end, through a throat, while drawing in and accelerating atmospheric air, which enters the large end of the atmospheric air nozzle, and said atmospheric air follows the surface thereof in a laminar flow. In so doing, the velocity of the exhaust gases is almost equalized with the atmospheric air in the nozzle and most of the inertial energy in the exhaust gases is transferred to the air at a reduced energy level.
2. An intake air inlet: located near the throat (smallest diameter) of the atmospheric air nozzle. The high inertial intake air at the throat of the atmospheric air nozzle passes through the intake air inlet and into a transfer tube. As the intake air passes into the intake air inlet, it decelerates to a small fraction of the velocity it has before it enters the intake air inlet and passes into the high pressure in the transfer tube. The high inertial energy of the air before entering the intake air inlet is thus converted into pressure and heat energy by compression.
3. Water injector(s): The heat produced by the compression increases the work of compression and increases the maximum temperature of combustion without sizably increasing the temperature drop and is therefore detrimental. Therefore, before the air approaches the intake air inlet, relatively cold water is injected into the air flow at the circumference of the atmospheric air nozzle, and this cold water absorbs most of the heat of compression, producing a nearly isothermal compression. This isothermal compression requires much less energy than would be required if the heat were not absorbed by the water, and a considerably higher intake air pressure is achieved.
4. A water separator: of commonly known type. The compressed and cooled air gives up most of its natural water content in the form of suspended vapor and the water injected into the air before compression adds to this water content. In order to have water to continue injecting before compression, and for other purposes to be revealed, the high water content intake air passes through the water separator which removes most of this water vapor.
5. A water-cooling heat exchanger: The water from the water separator is warm due to the heat of compression and a portion of this separated water, required to re-inject for the purpose of keeping the intake air cool during compression, is then passed through the water-cooling heat exchanger or radiator, passing the heat to the atmosphere or using it for heating a cabin or building or other desirable purpose. This cooled water is then transferred back to water injectors in the atmospheric air nozzle. The air pressure in the atmospheric air nozzle before the air enters the converging air nozzle is below atmospheric pressure. As the air is compressed it carries the water spray with it and the pressure in the water separator and cooling heat exchanger is then naturally high. The pressure differential between these two areas naturally produces the pressure necessary to inject the water into the intake air nozzle.

From the compressor assembly, the intake air passes through the intake tube to a combustion chamber inlet.

In addition to the water for cooling the compression, some or all of the remaining water from the water separator is directed to a mixer of known type, usually a simple turbulent flow connection, which mixes a portion of the water, usually all of the remaining water, with the fuel for the purpose of preventing carbon deposits from forming in a fuel superheater.

The fuel superheater is contiguous with an exhaust nozzle/combustion chamber and/or a "bullet" in an exhaust nozzle, described in detail below. The fuel/water mixture passes from the mixer to a high pressure fuel pump. This pump supplies the fuel/watermixture to a fuel vaporizer chamber, through a fuel injector. High temperature fuel/water vapor from the superheater circulates into the fuel vaporizer chamber and vaporizes the injected fuel/water. Thus the fuel is vaporized by the hot vapors recirculated from the superheater and the liquid fuel never boils off of hot metal, which would tend to produce carbon deposits.

The water in the fuel prevents carbon deposits in the fuel vaporizer chamber, the fuel superheater and other hot metal parts subjected to the superheated fuel, further protecting the hot metal from carbon deposits. It is necessary that this water be free of mineral content, and the condensation of water from the atmosphere provides virtually distilled water.

The fuel superheater superheats the fuel/watervapor mixture from the fuel vaporizer chamber, and also cools the exhaust nozzle/combustion chamber and/or "bullet".

A fuel injector nozzle is aimed at the combustion chamber inlet so as to create a high inertial flow of these vapors into the combustion chamber inlet and so as to transfer most of this high inertial energy to the already compressed intake air, further increasing the pressure of the intake air as it enters the combustion chamber.

The use of high pressure fuel vapors to help compress the gases into the combustion chamber is not essential to the process, but it does improve the compression and therefore the efficiency.

Unless the expansion ratio in the exhaust nozzle is such as to exhaust at exactly the right pressure in relation to the atmospheric air, there will be a series of stationary pressure waves produced in the exhaust, with vacuum waves between the pressure waves. This results in a power loss. However, if these are kept small, they may be used to advantage by placing two pressure sensors, one fore and one aft of the converging air nozzle, for the purpose of sensing the location of the first and strongest pressure wave. These sensors control an electric or a gas-powered screw-type linear actuator, of a known type, to adjust a "bullet", as is common to ram jets, to vary the ratio of throat to final diameter of the exhaust nozzle, and thus to control the position of the standing wave, so to increase the intake air pressure at the intake air inlet. The means of accomplishing this will become clearer as the drawings are described. This can greatly increase the compression and thus the performance of the drive, in as much as the actual pressure in the atmospheric air nozzle just before the intake air inlet is very low, in the area of five to seven pounds absolute at sea level and less at high altitude, in most cases. This standing wave is especially desirable at very high altitude where the air is at very low absolute pressure.

The use of a vapor-driven fuel injector for the high pressure fuel pump is preferable for most uses because it has no moving parts and requires no external energy sources such as electricity. This can provide an engine having no moving parts, more properly called a motor. Such a fuel pump consists of an injection nozzle supplied with the high temperature, high pressure fuel vapors from the fuel superheater, which injects the vapors at a very high velocity into a chamber supplied with liquid fuel and usually water, accelerating the liquid to such an inertial energy as to inject the liquid into the same superheater as the fuel vapor left. In this process, the fuel/water vapor is condensed into the liquid flow being pumped. To start the action, a vent to the low pressure side is usually used to raise the flow to sufficient velocity and then the vent is suddenly closed to start the pumping action.

As the intake air and fuel mixture enter the combustion chamber, they rapidly mix and burn as they pass a flame front. A turbulence may be designed into the combustion chamber inlet to aid in the mixing of the fuel vapors with the air. The resulting combustion produces a large expansion of the gases in the combustion chamber. The high water content produces a lower combustion chamber temperature without decreasing the expansion ratio. As the gases are exhausted, the cycle continues. A spark plug in the combustion chamber provides the means of ignition.

To facilitate starting, a compressed air tank is provided, which produces a controlled flow of air into the combustion chamber as a flow of fuel is simultaneously produced, preferably by the carburetor principle, which produces a controlled fuel-air mixture for starting before the high pressure pump begins its operation. This compressed air tank is automatically recharged from the high pressure air in the intake tube after the motor is started.

The high velocity flow of exhaust gases is the primary medium of energy for useful work, and may be used in many ways, such as an aircraft jet engine, a jet engine for boats and ships, or the high inertial energy may be converted to pressure energy through a diffuser to create a source of high pressure gases for many purposes, or the gases may be passed through a gas turbine to produce rotary power, or the high velocity gases may be passed through a venturi to produce a vacuum, etc.

As in virtually all heat engines, the efficiency is proportional to the ratio of temperature drop in the expansion of the working gases and the temperature drop is dependent upon the expansion ratio of the burned gases. The expansion ratio of the gases through an exhaust nozzle is dependent upon a high pressure in the combustion chamber. Therefore it is highly desirable that the pressure and temperature rise in the combustion chamber be high. This is achieved in the present invention by containing the high pressure in the combustion chamber by properly sized combustion chamber inlet and exhaust nozzles, as well as several of the factors described above.

Although water injection lowers the temperature rise, it compensates for the lower temperature rise through the high expansion of the water as it vaporizes into steam. The ratio of temperature drop remains about the same.

In as much as it may at first seem impossible to take a small portion of the energy of the gases from the combustion chamber and, using only the energy of these gases, compress a much greater mass of air back into the same combustion chamber at the same pressure and still have considerable energy left in the main flow to do useful work, it is suggested that this is similar in principle to the common practice in steam boilers of taking a small amount of steam from the boiler and directing it through a steam injector so as to refill the boiler with water. A brief explanation of how this principle works in the present invention may be very simply seen as follows:

The energy necessary to adiabatically compress one ounce of combustible gases having an initial volume of one cubic foot to a given pressure [X] may be expressed as [1X]. If the same one ounce of combustible gases is heated until it expands to ten cubic feet at the initial pressure, the energy required to compress it to pressure [X] will then be [10X]. So the energy required to compress the intake gases into the combustion chamber is directly proportional to the volume of the gases, not to their mass. Likewise, the work the compressed gases are capable of upon expansion is directly proportional to their volume and the usable energy gain in the combustion chamber is approximately proportional to the ratio of heat gain and the expansion is dependent on this ratio. Therefore, it is desirable to cool the intake gases as much as possible before their introduction into the combustion chamber in order to reduce their volume and in order to increase their density, and to heat the compressed gases in the combustion chamber as much as possible in order to increase their volume until their work is completed. When the air and fuel burn under pressure in the combustion chamber, the mixture increases greatly in volume, due largely to the increase in its temperature, although the chemical conversion of a liquid-fuel/air mixture into burned gases also expands the gases noticeably. Through this combustion process and the sharp temperature rise the pressure remains virtually constant, while the volume increases significantly. Thus, the hot expanded gases can do much more work than is required to compress the same gases when cold. Therefore, the cooled intake air may be compressed by a small portion of the energy of these hot gases from the combustion chamber when properly applied.

This energy is applied by accelerating the ultra-low density gases from the combustion chamber through a convergent-divergent expansion nozzle. Being of ultra-low density, the combustion chamber pressure accelerates these gases to an ultra high velocity. This ultra high velocity and resulting ultra high inertial energy, is applied to the cool, dense atmospheric air, which is capable of reaching an inertial energy sufficient to decelerate to the same original pressure as the combustion chamber, from a much lower velocity than was present in the exhaust velocity. The cooling of air while it is compressing substantially reduces the energy required to compress the air.

Theoretically about 10% of the inertial energy in the exhaust gases can compress the intake gases into the combustion chamber. Actually the figure is nearer to 15% due to frictional and heat losses, but this will vary considerably with individual applications. This is when the compression of the intake air is nearly isothermal, the combustion gases expand under nearly adiabatic conditions and the combustion chamber temperature and pressure are reasonably high. Through refinements in design, somewhat higher efficiencies of compression may be obtained.

High or low pressure gases may be drawn from whatever area of the compressor system that suitable pressures or vacuums are available to do useful work, such as operate retractable landing gears, flaps, pressurize cabins, drive alternators, etc. Throttling of the engine may be accomplished through a needle valve in the fuel vapor nozzle or other means of controlling the fuel flow. The adjustable "bullet" may be used in the exhaust nozzle to control the combustion pressure and expansion ratio at low throttle settings as well as to adapt to different atmospheric pressures.

At very high altitudes where atmospheric oxygen is insufficient, or for short bursts of power, high pressure supplemental oxygen may be introduced into the intake tube by means of another nozzle similar to that used to introduce the high pressure fuel vapors into the intake tube and so as to again increase the compression of the intake air, which is especially necessary under the conditions when supplemental oxygen is needed.

When still less atmospheric oxygen is available, such as an anoxic environment, a valve may be used to close the intake tube to prevent a back flow and the entire oxygen supply may be provided in liquid form. Thus, the transition from atmospheric oxygen to supplied oxygen may be a smooth and efficient transition, first using exclusively atmospheric oxygen, then supplementing the atmospheric oxygen as the atmospheric oxygen becomes insufficient, and gradually increasing the supplemental oxygen as needed until all the oxygen is supplied in liquid form.

A liquid fuel boiler jacket is usually used as described above and such is common practice in liquid-fueled rockets. A liquid oxygen boiler jacket may be similarly used. Here again, a high pressure pump of the vapor-powered type or other known type is used to create the pressure. With liquid oxygen, the pressure in the combustion chamber increases considerably, possibly reaching pressures in the area of 3,200 P.S.I. as in the Space Shuttle main engine. This then requires a much larger expansion ratio of the exhaust from the combustion chamber, especially into the vacuum of space. This is accomplished by using a retractable exhaust nozzle extension and retractable compressor assembly. The mechanical means of retraction of the exhaust nozzle extension and the compressor assembly may be of drastically varied design, just as the retraction of an aircraft landing gear may be, and therefore no detailed description is given.

While the acceleration of the intake gases by the use of a high inertial fuel vapor from a high pressure fuel superheater and the acceleration of the intake gases into the intake system by means of high velocity exhaust gases has been done by others, the compression of the intake air without mixing the exhaust gases with the intake air is considered novel. Also, the isothermal compression of the intake air is considered novel, all others using adiabatic compression. Furthermore, the separation of water from the intake air to add to the fuel to prevent carbon formations in the fuel superheater instead of using water from an external source is considered novel. The use of superheated water vapor from water separated from the atmosphere to further increase compression is also considered novel, as is the sealing of the intake system from back-flow when replacing the ambient oxygen with a liquid oxygen source and a retractable exhaust nozzle extension for conversion to use in an anoxic environment. Furthermore, the use of compressed air through a carburetor for starting is considered novel as is the recharging of the compressed air tank for starting from the high pressure intake air.

BEST MODE FOR CARRYING OUT THE INVENTION

Figure 1:
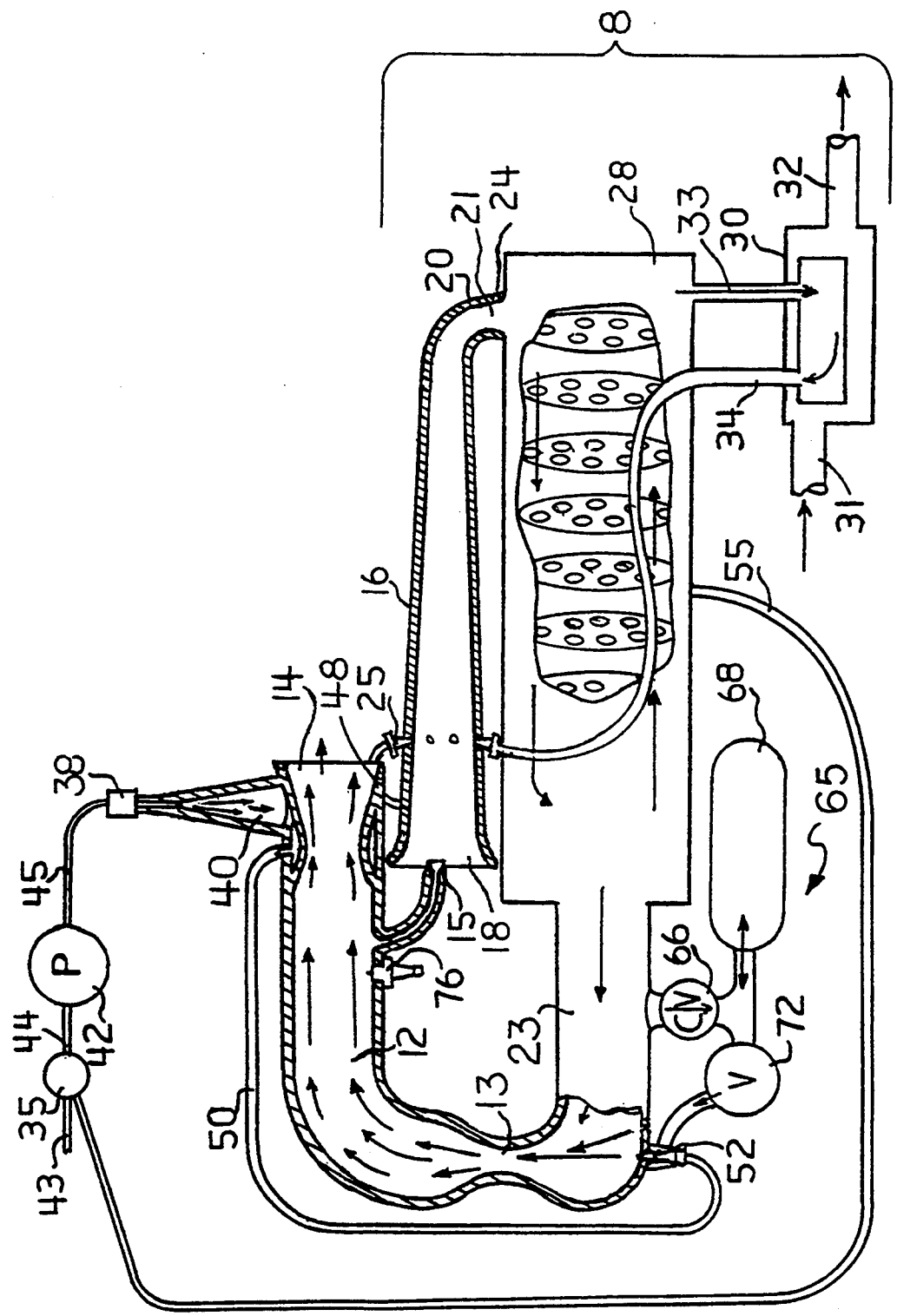
FIG. 1 is a partial cross-sectional view of the preferred embodiment, illustrating the basic drive with a main exhaust nozzle and a second exhaust nozzle for the specific purpose of compressing the intake air.
Figure 2:
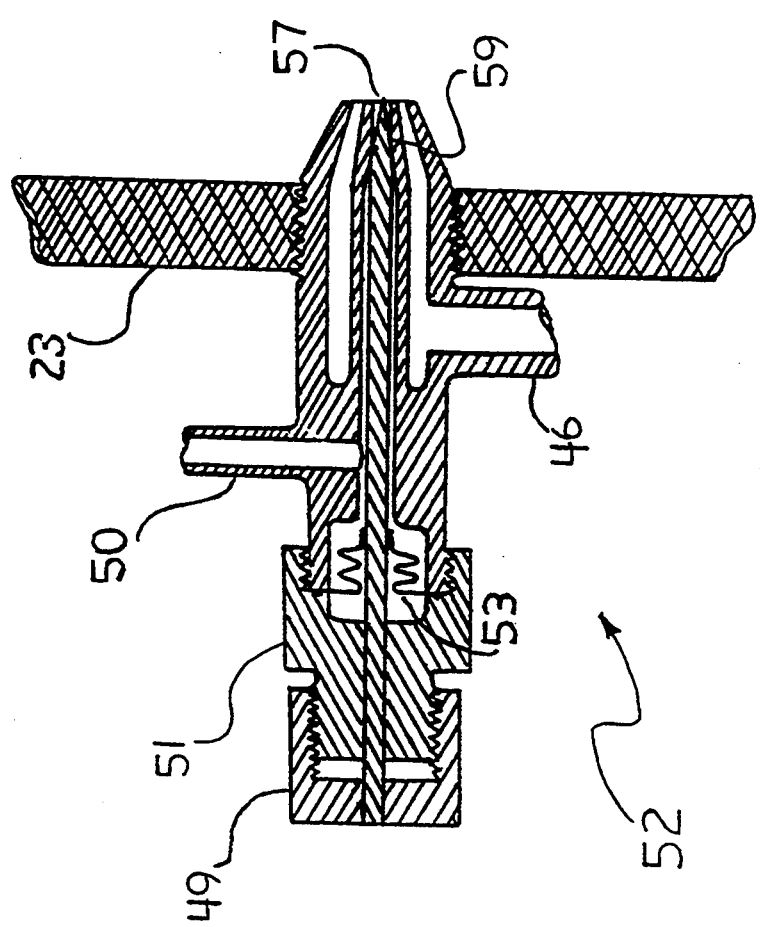
FIG. 2 is a cross sectional view of the fuel injector nozzle 52, illustrating the combined air/fuel nozzle design as a carburetor for starting, as well as a high pressure fuel/water vapor injector for general operation.
Figure 3:
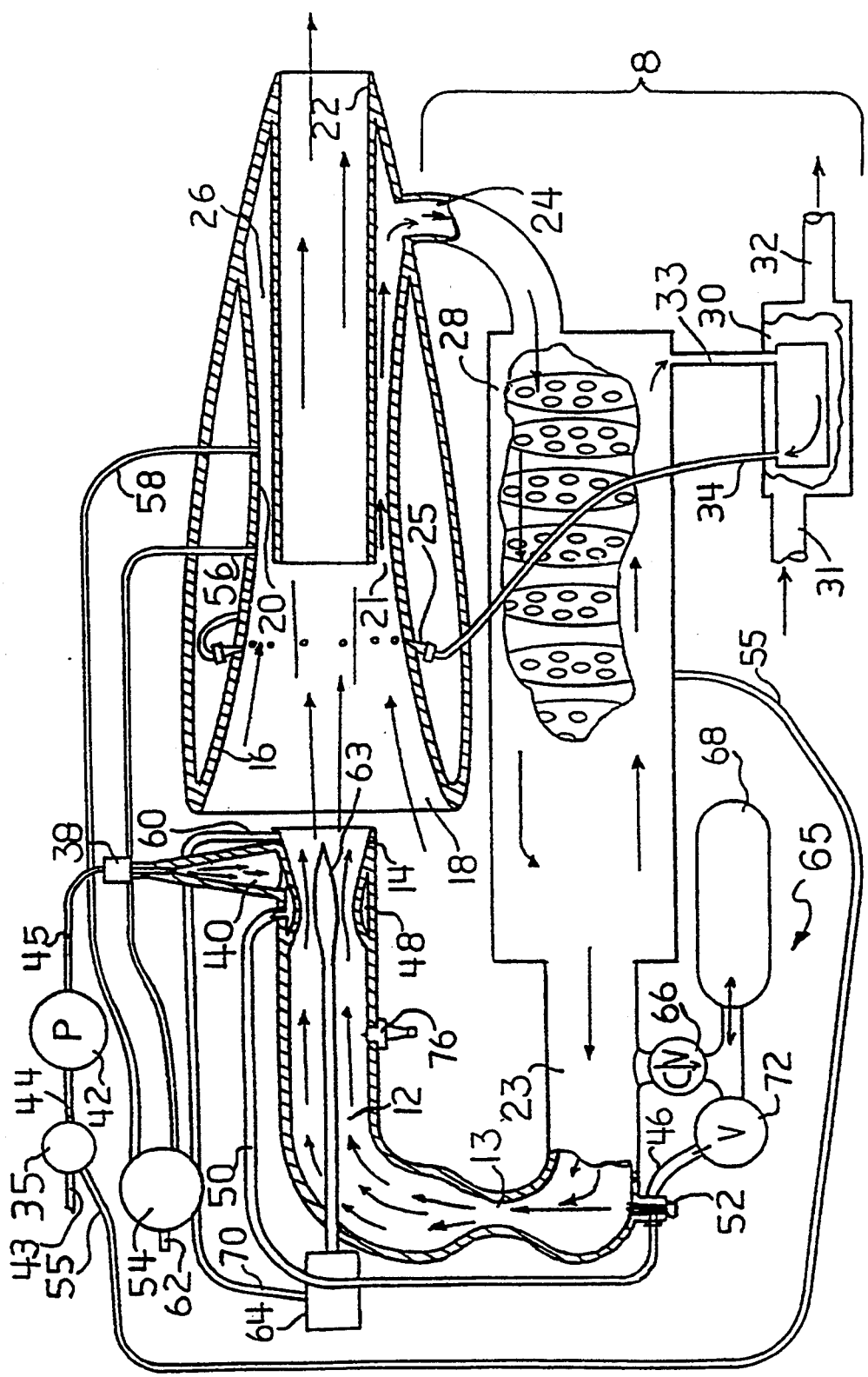
FIG. 3 is a partial cross sectional view of the preferred embodiment with only one exhaust nozzle and having an atmospheric air nozzle such that the intake air is kept separate from the exhaust gases.
Figure 4:
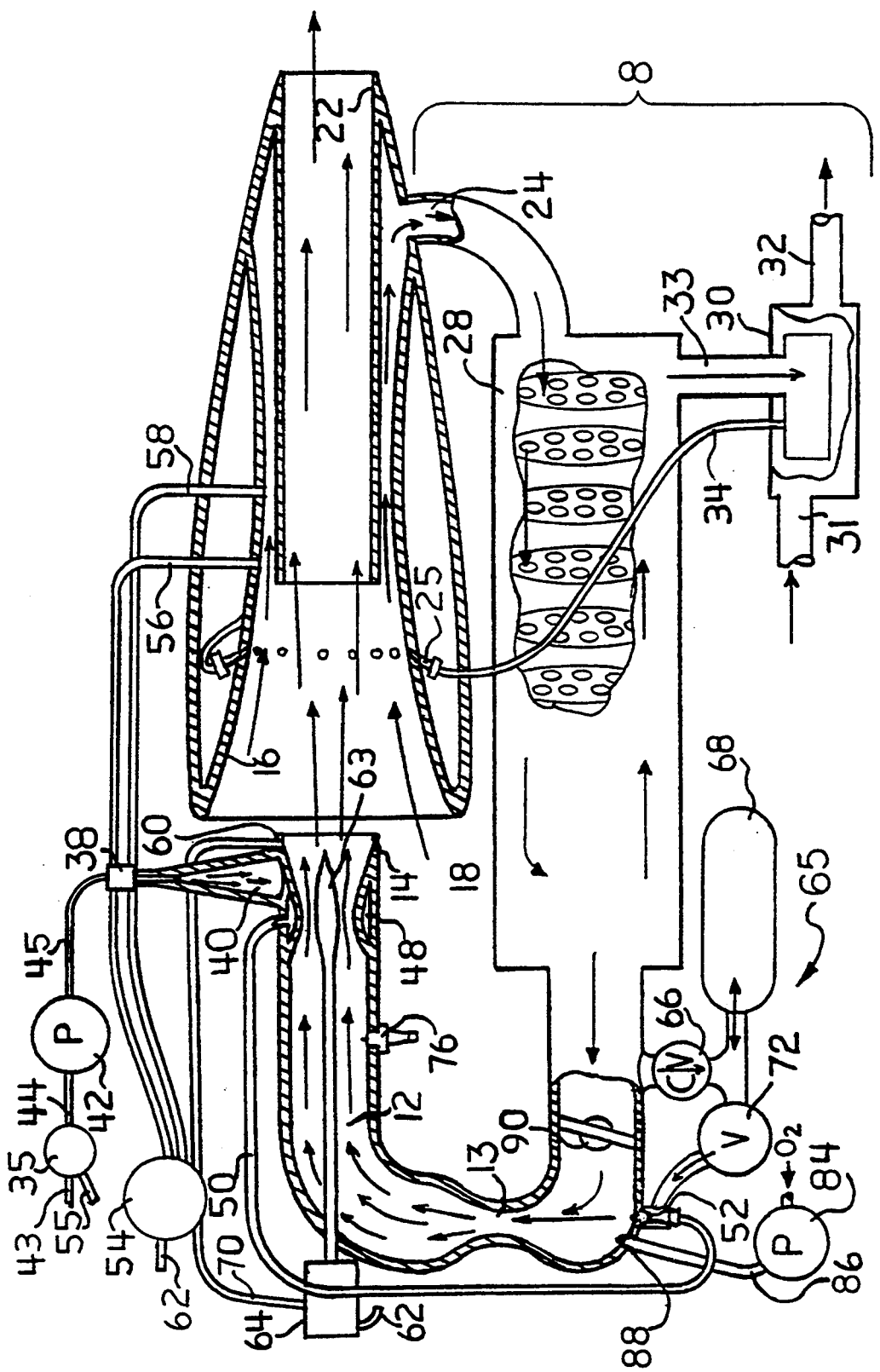
FIG. 4 is a partial cross-sectional view of the preferred embodiment as shown in FIG. 3 adapted for liquid oxygen use, illustrating the use of liquid oxygen to supplement and or replace the atmospheric oxygen, and with the addition of an exhaust nozzle extension.
Figure 5:
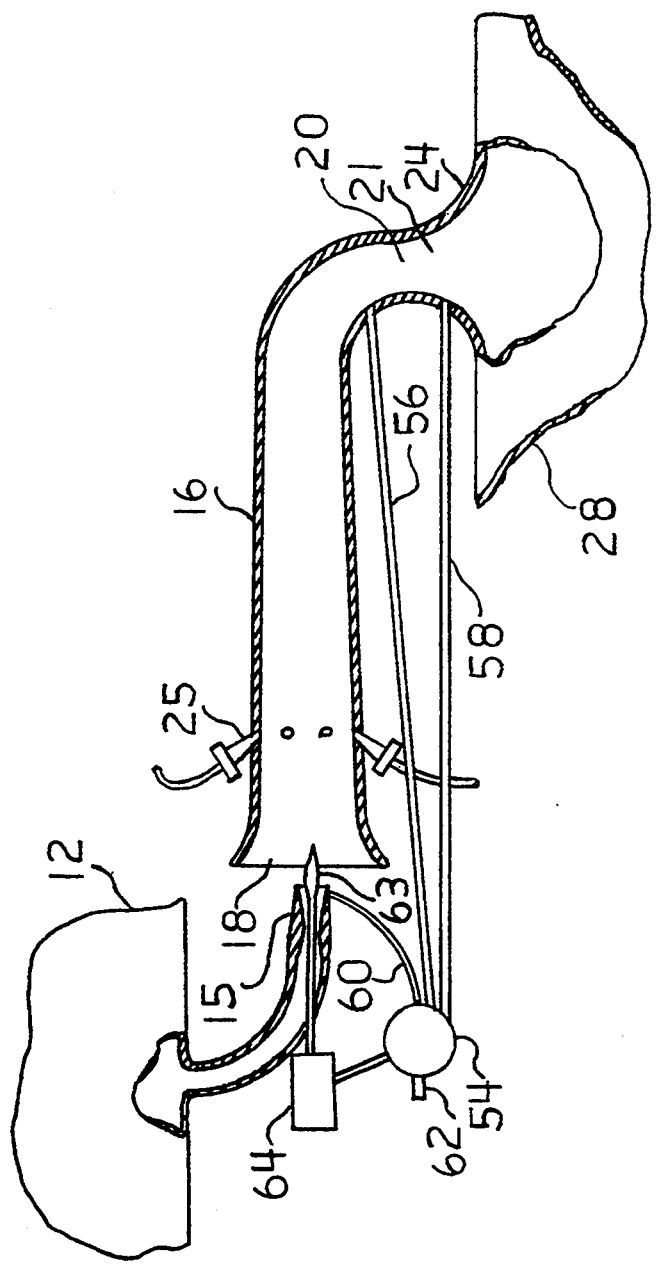
FIG. 5 is a partial cross-sectional view illustrating a bullet applied to nozzle 15 in FIG. 1 with the appropriate sensors, control and linear actuator.

The best mode for carrying out the invention is presented in terms of a basic, second and third embodiments, as represented by FIGS. 1, 3 and 4. FIG. 2 illustrates the fuel vapor injector having the function of a carburetor during the starting cycle. FIGS. 1 and 3 are the same except that the atmospheric air nozzle in FIG. 1 is allows the exhaust gases passing through it to recirculate through the combustion chamber, while FIG. 3 keeps the exhaust gases virtually separate from the intake air. FIG. 4 is a basic drive as in FIG. 3 but as adapted for use with liquid oxygen for use in and out of an anoxic environment.

The preferred embodiment is illustrated in FIG. 1 and is comprised of two basic assemblies. The first is a combustion chamber 12 having a combustion chamber inlet 13, of reduced size, and a convergent-divergent type exhaust nozzle 14 which accelerates the high pressure exhaust gases from the combustion chamber 12 at a supersonic velocity for the purpose of performing work and a second exhaust nozzle 15 whose sole function is to compress the intake air to the combustion chamber 12. The second is a compressor assembly 8, which is powered by a second exhaust nozzle 15. The compressor assembly consists of an atmospheric air nozzle 16 having a mouth 18 and a throat 20. The atmospheric air nozzle is aligned with the exhaust nozzle 15 so that the exhaust gases flow through the atmospheric air nozzle, entering at the mouth 18 and flowing through the throat 20 thereof, and exiting with the intake air through intake air inlet 21 into water separator 28 through transfer tube 24. The ultra-high velocity exhaust gases draw atmospheric air in at the mouth 18, accelerate the atmospheric air by transferring most of the inertia of the exhaust gases to the atmospheric air, and thereby equalizing their velocities. In this manner the atmospheric air entering the atmospheric air nozzle is accelerated to a high supersonic velocity and a high inertial energy level. This atmospheric air is used for the intake air. The exhaust gases from the second exhaust nozzle 15 and the atmospheric air rapidly decelerate as they enter the throat 20 of the atmospheric air nozzle 16. This deceleration produces a compression. They then pass through transfer tube 24 into water separator 28.

Meanwhile, cooling water is injected into the atmospheric air nozzle 16 by water injectors 25 located between the mouth 18 and throat 20. The water absorbs most of the heat of compression from the air as it compresses through an intake air inlet 21, providing nearly isothermal compression. If the water is injected near enough to the mouth 18, the water will receive sufficient inertia from the exhaust gases to help compress the air by carrying the air through converging air nozzle 21 by the waters inertia. This water passes through the throat 20 and transfer tube 24 into the water separator 28, which separates the water injected by water injectors 25 and also separates a large quantity of water from the air formed by compressing and cooling the intake air. The cooling water for cooling the compression of intake air is then passed through a water transfer tube 33 to a heat exchanger through water injector line 34 to cool the water for injection by water injectors 25. The heat of the cooling water is absorbed by the cooling medium, usually atmospheric air or water from a remote water heat radiator, entering cooling medium inlet 31 and exiting cooling medium outlet 32.

The air in the atmospheric air nozzle is at very low pressure due to its high velocity, while the water supplied to the water injectors is at a high pressure from the intake air inlet 21. This pressure differential provides the high pressure required for the water injection.

From the water separator 28, the intake air flows through intake tube 23 to combustion chamber inlet 13 and on into the combustion chamber 12. Meanwhile, some of the water from the water separator 28 is fed by a water line 55 to a mixer 35 which mixes the water from line 55 with fuel from fuel line 43, for the purpose of preventing carbon deposits in the fuel superheater 48 and for better cooling of the combustion chamber. This mixing action is usually accomplished by a turbulent flow of water and fuel.

The fuel-water mixture is carried from the mixer 35 to a fuel pump 42 by the fuel line 44. The high pressure fuel-water mixture leaving fuel pump 42, now at a very high pressure, usually over 1000 P.S.I., passes through fuel line 45 to second fuel injector 38, which injects the fuel-water mixture into vaporizer chamber 40.

Superheated fuel-water vapor recirculates from the fuel-water superheater 48 (shown in the drawings as being contiguous to the combustion chamber 12, into vaporizer chamber 40. The fuel is injected into this superheated fuel vapor, so that the mist of fuel from the fuel injector 38 is vaporized in the superheated fuel vapor and does not boil off of hot metal. The gases from the vaporizer chamber 40 then pass into the superheater 48, where they are further heated. This boiling of the fuel by hot vapors, rather than boiling off of hot metal, prevents carbon deposits from forming in the superheater.

Superheated fuel vapor passes through fuel line 50 to the first fuel injector 52, which converts the high fuel-water vapor pressure into a high velocity, high inertial flow of the vapor, aimed toward the combustion chamber inlet 13. This high inertial flow accelerates the flow of compressed air in the intake tube 23, increasing the inertia of the flow into the combustion chamber. As the flow passes into combustion chamber inlet 13, it is decelerated by the pressure inside the combustion chamber, converting its high inertia into a still higher pressure.

FIG. 2 is a cross sectional view of the nozzle 52, showing the combined air and fuel flow. A seal 53 is shown as a bellows-type seal and prevents fuel leakage past needle 57. A seal retainer nut 51 holds seal 53. A throttle nut 49 adjusts needle 57 in the valve seat 59 to control the amount of fuel flow and thus the throttle. Starting is achieved by opening compressed air valve 72, allowing compressed air from the compressed air tank 68 to accelerate through the nozzle 52. The air exiting around valve seat 59 draws fuel through, atomizes the fuel and mixes it with the air by the common carburation principle. This air carries said fuel/air mixture through combustion chamber inlet 13 at low velocity. Spark plug 76 then ignites the air-fuel mixture. When the fuel superheater 48 heats to the boiling point, the fuel mixture begins its normal flow, drawing air into combustion chamber 12 with it. Valve 72 then closes, stopping the air flow. As the pressure rises in intake tube 23, the pressure recharges compressed air reservoir 68 through check valve 66. Thereafter, the engine may be stopped and restarted. Once up to normal operating temperature, the fuel air mixture is not critical and combustion is efficient at any mixture provided there is sufficient air present, much like a common diesel engine.

FIG. 3 is the same as FIG. 1 except that it has only one exhaust nozzle and the atmospheric air nozzle 16 has an exit section 22 which carries most of the exhaust gases and atmospheric air entering atmospheric air inlet 18 through to exit for the purpose of performing work. A portion of the atmospheric air near the circumference of the atmospheric air nozzle, flowing at supersonic speed, enters the intake air inlet 21 formed by throat 20 and the forward part of an exit section 22 forming a ring-shaped nozzle between the circumference of the exit section and throat 20. It is not essential that the nozzle be around the full circumference. Exit section 22 also forms the duct for most of the gases passing through the atmospheric air nozzle and allows the main flow to pass through to provide the main power source. This configuration results in keeping the intake air and the exhaust gases virtually separated, providing more oxygen to the combustion chamber and increasing the temperature rise in the combustion chamber and the temperature drop through the exhaust nozzle. The addition of atmospheric air to the exhaust gases exiting through the exit section reduces the heat of the final exhaust and the final velocity, which is desirable for many applications. The rapid deceleration of the atmospheric air near the circumference of the atmospheric air nozzle causes it to compress as it enters the intake air inlet 21, converting most of its inertial energy into pressure and heat energy. This compressed air entering intake air inlet 21 is the intake air for combustion.

A bullet 63 as illustrated in FIG. 2 may be used in any of the exhaust nozzles but is shown here in exhaust nozzle 14, and is used to adjust the expansion ratio of exhaust nozzle 14 for maximum efficiency at different altitudes and to produce a standing wave if desired. To accomplish this a first vent tube sensor 60 senses the pressure of the gas exiting the exhaust nozzle 14, while a second vent tube sensor 62 senses the atmospheric air pressure. The signal from each of the sensors is transmitted to a control 54. The control 54 may be of any one of several known types. However, in the preferred embodiment it is shown as a minicomputer. Control 54 is connected to linear actuator 64 by control input line 70 and controls linear actuator 64, which may be operated by an electric motor or air motor through a gear reduction and screw. If it is powered by an air motor, the air pressure/vacuum differential from sensors 56 and 58 may provide the power. Linear actuator 64 operates bullet 63 forward or backward as necessary to adjust the expansion ratio of the exhaust nozzle.

A standing wave may be produced with the high pressure of the wave at the intake air inlet 21 to noticeably increase the compression of air into the intake air inlet 21. This standing wave is usually best produced by discharging the exhaust gases from exhaust nozzle 14 at a slightly lower pressure than the atmosphere. This produces a high pressure wave, which will be followed by a series of low and high pressure waves, each one smaller than the one before. This high pressure wave must then be held near the intake air inlet. The high pressure standing wave can be produced by discharging the exhaust gases from nozzle 14 at a slightly higher pressure than the atmosphere. This will produce a low pressure wave which will be followed by the high pressure wave which is then held near the intake air inlet. This has the advantage of a somewhat higher efficiency in the nozzle 14. To achieve and control this pressure either way, sensor 56, located just before converging air inlet 21, and sensor 58, located just after converging air inlet 21, feed air pressure differentials to control 54, slightly modifying the information supplied by sensors 60 and 62. This information causes control 54 to make small adjustments to bullet 63 through linear actuator 64, thereby controlling the expansion ratio and thus the position of the high-pressure standing wave, keeping it near the intake air inlet 21. The selection of the first wave as a high pressure wave verses the first wave being a low pressure wave is dependent upon the control 54 and specific design considerations.

FIG. 4 illustrates the drive used with liquid oxygen, in and out of an anoxic environment. It is the same as the preferred embodiment in FIG. 3 with the following exceptions:

When supplemental oxygen is needed, liquid oxygen is pumped by oxygen pump 84 through oxygen line 86 to oxygen nozzle 88, which injects the oxygen through the combustion chamber inlet 13 and rapidly mixes it with the intake gases. When sufficient atmospheric air becomes unavailable, backflow valve 90 closes. At this stage, compressor assembly 8 retracts and is replaced by an exhaust nozzle extension 80. Exhaust nozzle extension 80 connects with exhaust nozzle 14, forming an increased expansion for nozzle 14 to efficiently expand the exhaust gases in a vacuum. The possible means of accomplishing

| NOMENCLATURE | |
|---|---|
| 1. | 46. Air line |
| 2. | 47. |
| 3. | 48. Superheater |
| 4. | 49. Throttle nut |
| 5. | 50. Fuel line |
| 6. | 51. Seal retainer nut |
| 7. | 52. First fuel injector nozzle |
| 8. Compressor assembly | 53. Seal |
| 9. | 54. Control |
| 10. | 55. Water line |
| 11. | 56. Sensor |
| 12. Combustion chamber | 57. Needle |
| 13. Combustion chamber inlet | 58. Sensor |
| 14. Exhaust nozzle | 59. Valve seat |
| 15. Second exhaust nozzle | 60. Sensor |
| 16. Atmospheric air nozzle | 61. |
| 17. | 62. Sensor |
| 18. Mouth | 63. Bullet |
| 19. | 64. Linear actuator |
| 20. Throat | 65. Starter assembly |
| 21. Intake air inlet | 66. Check valve |
| 22. Exit section | 67. |

NOMENCLATURE

| | |
|---|---|
| 23. Intake tube | 68. Compressed air tank |
| 24. transfer tube | 69. |
| 25. Water injectors | 70. Control input line |
| 26. | 71. |
| 27. | 72. Compressed air valve |
| 28. Water separator | 73. |
| 29. | 74. |
| 30. Heat exchanger | 75. |
| 31. Cooling medium inlet | 76. Spark plug |
| 32. Cooling medium outlet | 77. |
| 33. Water transfer tube | 78. |
| 34. Water injector line | 79. |
| 35. Mixer | 80. Exhaust nozzle extension |
| 36. | 81. |
| 37. | 82. |
| 38. Second fuel injector | 83. |
| 39. | 84. Oxygen pump |
| 40. Vaporizer chamber | 85. |
| 41. | 86. Oxygen line |
| 42. Fuel pump | 87. |
| 43. Second fuel line | 88. Oxygen nozzle |
| 44. Fuel line | 89. |
| 45. Third fuel line | 90. Backflow valve | this retraction- are as varied as the means to retract an aircraft landing gear, and therefore, being a design consideration, no exact mechanical device is shown. Under these conditions, water from the atmosphere is no longer available to mix with the fuel. However, the temperature in the fuel vaporizer chamber 40 is high by this time, and the fuel is completely vaporized by the superheated fuel vapors from the superheater 48, and therefore carbon does not tend to form.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the claims.

I claim:

1. An improved thermodynamic drive comprising:
   a) a combustion chamber having a combustion chamber inlet that receives compressed air which is ignited in said combustion chamber and where the resulting expanded exhaust gases are exhausted through at least one convergent-divergent exhaust nozzle at a supersonic velocity,
   b) an atmospheric air nozzle aligned with one of said exhaust nozzle(s) to allow the exhaust gases to flow therethrough, while entraining atmospheric air into its flow, thereby equalizing the velocity and inertial energy of the entrained air with that of the exhaust flow and where the resulting intake gases are decelerated and thereby compressed by converting their high inertial energy into pressure and heat energy,
   c) at least one water injector(s) located between the mouth and the throat of the atmospheric air nozzle, where said injector(s) inject cooling water into the intake gases before they are compressed,
   d) a water separator having a first end and a second end, where the first end is connected through a transfer tube to said atmospheric air nozzle and where the second end is connected to the combustion chamber inlet through an intake tube, where said water separator receives the compressed intake gases and removes the condensed water before the gases flow into said combustion chamber inlet,
   e) a water-cooling heat exchanger having a first end and a second end, where the first end is connected to the water separator and receives the heated water from the water separator and transfers the heat of the water to a cooling medium flowing therethrough, and where the second end of said heat exchanger connected to the water injectors to supply the cooled water, and
   f) a first fuel injector that injects the fuel into the combustion chamber supplied by fuel from a first fuel line.

2. The improved thermodynamic drive as specified in claim 1 further comprising:
   a) a superheater contiguous to said combustion chamber, which superheats the fuel,
   b) a vaporizer chamber having a first end and a second end where the first end is connected to the fuel superheater and the second end is connected to a second fuel injector, where said vaporizer chamber is supplied with fuel from the second fuel injector and recirculates superheated fuel for the purpose of vaporizing said fuel,
   c) a second fuel line from a high pressure pump connected to the second fuel injector and supplying fuel thereto, and
   d) where said first fuel injector is located in the intake tube and directed toward the combustion chamber inlet, where said first fuel injector injects the superheated fuel vapor from the superheater into the combustion chamber inlet at high velocity and by means of the inertia of the fuel vapor, accelerates the cooled, compressed intake gases in the intake tube into the combustion chamber at increased pressure.

3. The improved thermodynamic drive as specified in claim 2 further comprising:
   a) a water line having a first end connected to said water separator and a second end connected to a mixer,
   b) the first fuel line from the fuel source also connected to the mixer, so that water from said water separator is mixed with fuel from the fuel source.

4. The improved thermodynamic drive as specified in claim 1 further comprising:
   a) a bullet, located central to said exhaust nozzle and shaped such that it may be moved fore and aft in the nozzle to vary the ratio of the throat area to the exit area and thereby the expansion ratio of the nozzle,
   b) a linear actuator connected to said bullet to control the fore and aft movement of the bullet,
   c) a control for controlling the linear actuator, and
   d) a first vent tube sensor placed at the exit of the exhaust nozzle and a second vent tube sensor exposed to the atmosphere, where said sensors provide pressure differentials to the control, so that the control can properly maintain the desired expansion ratio in the exhaust nozzle.

5. The improved thermodynamic drive as specified in claim 4 further comprising a first vent tube sensor located fore of the said throat in the said atmospheric air nozzle and a second vent tube sensor located aft of the said throat in the said atmospheric air nozzle, where said sensors are connected to the controller to modify its function to control the bullet for the purpose of producing a standing pressure wave at the intake air inlet, for the purpose of increasing the intake air compression.

6. The improved thermodynamic drive in claim 1 further comprising:
a) a liquid oxidizer source,
b) a high pressure oxidizer pump that delivers the oxidizer to the combustion chamber at high pressure,
c) a backflow valve in the intake tube that prevents a backflow through the intake tube when using a liquid oxidizer.

7. The improved thermodynamic drive as specified in claim 1 further comprising:
(a) a starter assembly having a check valve with a first end connected to an intake tube for receiving compressed air therefrom and a second end connected to a compressed air tank, where said check valve allows air to flow from the intake tube into the compressed air tank and prevents air from flowing from the compressed air tank directly back into the intake tube,
(b) a valve having a first end connected to the compressed air tank and a second end connected to said first fuel injector nozzle where said valve controls the flow of compressed air between the compressed air tank and the first fuel injector for the purpose of starting.

* * * * *